United States Patent [19]
Okada et al.

[11] Patent Number: 5,146,488
[45] Date of Patent: Sep. 8, 1992

[54] MULTI-MEDIA RESPONSE CONTROL SYSTEM

[75] Inventors: Akihiro Okada, Zama; Tooru Kino, Kunitachi; Katsumi Tanaka, Tokyo, all of Japan

[73] Assignee: Fujitsu Limited, Kawasaki, Japan

[21] Appl. No.: 465,266

[22] Filed: Feb. 14, 1990

[30] Foreign Application Priority Data

Jun. 14, 1988 [JP] Japan .................. 63-144650
Feb. 26, 1989 [JP] Japan .................. 1-044128

[51] Int. Cl.⁵ .................. H04M 3/50; H04M 7/00; H04M 11/00
[52] U.S. Cl. .................. 379/88; 379/89; 379/100
[58] Field of Search .................. 379/100, 89, 88

[56] References Cited

U.S. PATENT DOCUMENTS

| 4,748,618 | 5/1988 | Brown et al. | 370/94 |
| 4,837,798 | 6/1989 | Cohen et al. | 379/88 |
| 4,910,765 | 3/1990 | Matsuse et al. | 379/100 |

FOREIGN PATENT DOCUMENTS

| 60-162332 | 8/1985 | Japan . | |
| 61-18998 | 1/1986 | Japan . | |
| 0112453 | 5/1987 | Japan | 379/100 |
| 0112456 | 5/1987 | Japan | 379/100 |
| 63-90941 | 4/1988 | Japan . | |

OTHER PUBLICATIONS

"Digital Techniques for Computer Voice Responses: Implementations and Applications", L. R. Rabiner et al., *Proc. of the IEEE*, vol. 64, No. 4, Apr. 1976, pp. 416-433.

"Voice Response System and Its Applications", Y. O. Ozawa et al., *Hitachi Review*, vol. 28 (1979), No. 6, pp. 301-305.

Primary Examiner—Thomas W. Brown
Attorney, Agent, or Firm—Staas & Halsey

[57] ABSTRACT

The kind of medium owned by a user is stored in a service center system and a medium is determined by a request from the transmitting side in accordance with an inquiry to a receiver. Where a voice is used as a medium for the inquiry or the service, the sound piece data to which a descriptor is added and the sentence structure data for forming a single sentence by collecting the sound piece data and formed by a descriptor are stored. When the voice output request is produced, the sound piece data is obtained from the sentence structure data, thereby producing a voice of a desired sentence.

6 Claims, 14 Drawing Sheets

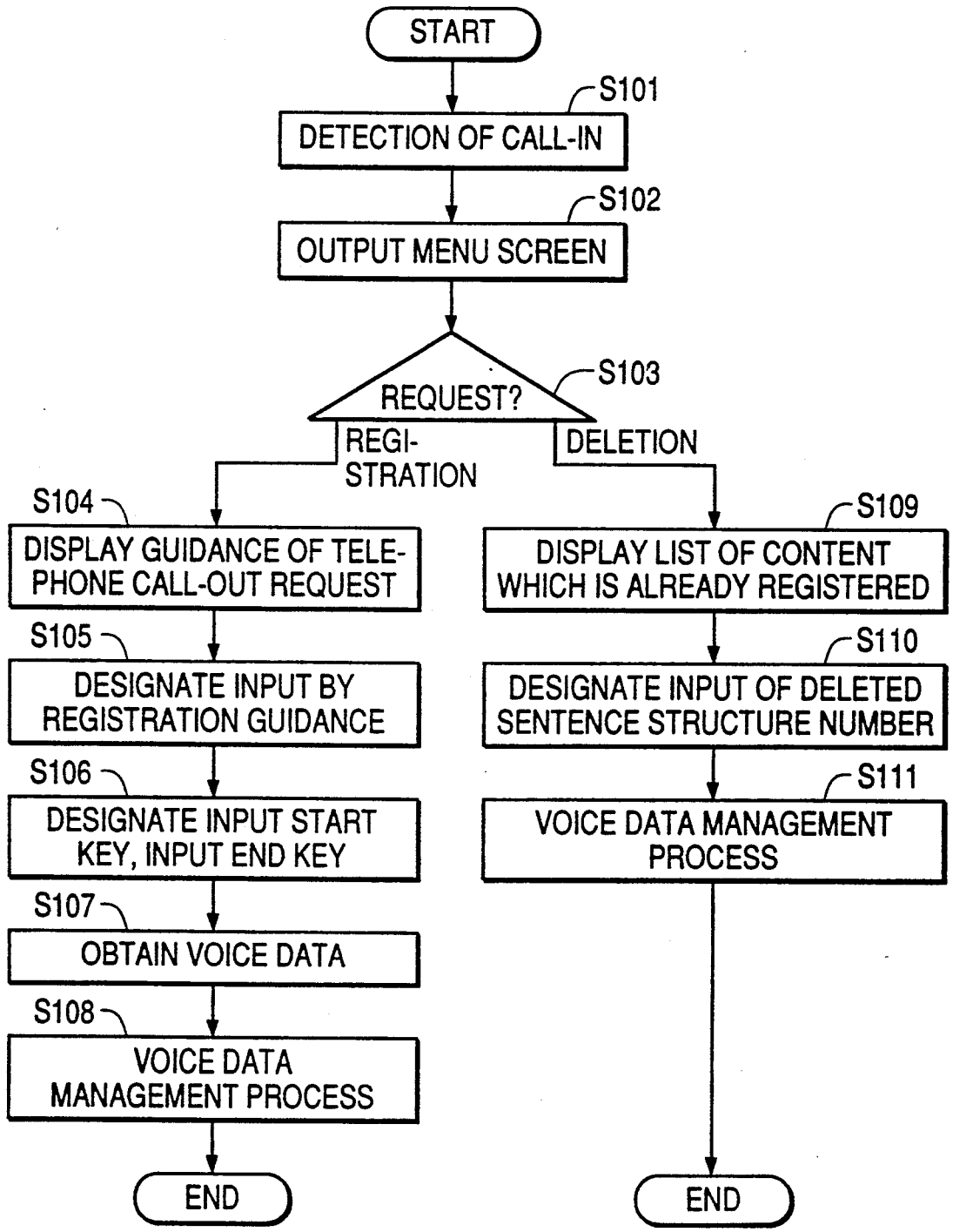

MULTI-MEDIA RESPONSE CONTROL SYSTEM

BACKGROUND OF THE INVENTION

1. Technical Field

The present invention relates to a computerized service system in a communication network and more particularly to a response control system for responding to various service requests.

2. Related Art

Conventionally, transfer (communication) of information is possible only between the same kind of transmitting media. However, with the recent development of network technology, a communication (multi-media communication) between different media has become possible. This multi-media communication should be performed with a simple structure, allowing simple, highly efficient operation.

FIG. 1 shows a block diagram of a structure of a conventional multi-media communication system. Different media such as terminals 1A and 1B, telephones 2A and 2B and facsimiles (FAX) 3A and 3B are connected through public circuit networks 4A and 4B. Center 5 for performing a control of a communication between both media is provided between public circuit networks 4A and 4B. Terminals 1A and 1B comprise a personal computer and modems (MDM) 6A and 6B are connected between terminals 1A and 1B and public circuit networks 4A and 4B. Center 5 functions as a modem.

In this system, a communication between the same kinds of media, such as between terminals 1A and 1B or between telephones 2A and 2B, can be performed, and a communication between different media, such as between terminal 1A and fax 3B, can also be performed.

FIG. 2 shows a sequence of a conventional multimedia communication which is performed by the above communication system.

FIG. 2 shows the case where information is transferred from transmitting-side medium 7A to receiving-side medium 7B through center 5. When a call-out is produced from transmitting side medium 7A to center 5 (A), center 5 receives this call-out and requests a transmitting side medium for an input of a transmitter ID (recognition number) (B). Transmitter ID indicates the owner of the medium. A single transmitter can have a plurality of media and they may be of different kinds.

When the transmitter ID is sequentially inputted from transmitting side media 7A (C), the ID file stored in center 5 is searched. When the transmitter ID is found in the ID file, center 5 requests an ID input of receiving media (D) from transmitting side medium 7A. Transmitting side medium 7A then inputs the ID of the receiving side medium to center 5 (E). Center 5 checks whether a receiving side medium ID exists by searching the ID file in center 5. If it does, the transmission side medium is requested to input the transfer file (F). Transmitting side medium 7A then inputs a transfer file (a set of data to be transmitted) to the center (6).

Center 5 produces a call-out to the corresponding receiving side medium 7B, based on the ID obtained from the ID input of the receiving side medium (H). Receiving side medium 7B then returns a response to the call-out to center 5 (I). When center 5 receives this response, the file transmitted from transmitting side medium 7A is transmitted to receiving side medium 7B (J).

In the conventional multi-media communication system, a conversion from text to image, for example, a communication from a personal computer to a FAX, can be conducted through a network service. A conversion from text to voice can also be conducted, thereby transmitting input data from the personal computer in the form of a voice.

However, in the conventional system, the transmitter must designate the receiver's medium. Namely, when information is transferred from the transmitting side to the receiving side, the data format varies depending on the kind of receiving side medium. Thus, it is necessary to detect the receiving side medium and for the receiving side to have prior knowledge of what kind of medium the receiving side has, or by what kind of medium the receiver wishes to receive the information. It is also necessary for the transmitting side to know the ID of the receiving side medium and its identification number (such as telephone number or FAX number), thus requiring the operator to perform a troublesome operation. In the future, communication between further different media (such as text to voice conversion, FAX to text conversion or voice to text conversion) may become possible, thus further complicating the operation.

Service systems using a computer in the above recited multi-media communication system, such as telemarketing, reference to the remainder of a deposit, security information service and electronic mail, are presented. In these systems, the response to a telephone request is made by voice. Therefore, the voice response means is provided on the computer side (service center). As the voice response control system used for the voice response means, a record editing system, an analyzing and synthesizing system, and a rule synthesizing system are known.

The record editing system records an analog voice signal or a voice signal subjected to a PCM coding. This signal is reproduced, outputted in a predetermined sequence and used as a time announcing service, for example, by a telephone. The analyzing and synthesizing system may be, for example, a PARCOR system, an LSP system, or a Formant system. A parameter for controlling a voice producing model, comprising excitation information and vocal track information, is stored as voice data and used to synthesize the voice. It is thus advantageous in that the amount of stored information may be small. The rule synthesizing system synthesizes a voice based on spectrum data of every phoneme and concatenating rule for connecting those spectrum data as voice data, and can thus form a discretionary response sentence.

The record editing system in the above recited prior art forms a response sentence by combining previously recorded short sentences and can obtain a response sentence in accordance with the way they are combined. However, the record editing system has to store many short sentences and thus requires a larger memory capacity than other systems. This makes it difficult to increase the number of response sentences when required. The analyzing and synthesizing system is advantageous in that the amount of memory information may be smaller than where the voice signal is stored through a PCM coding or through an ADPCM coding, but requires a large scale computer for performing a voice analysis. It is therefore disadvantageous in that the cost of the analyzing and synthesizing system is high and cannot correspond immediately to changes in tone color. Further, it also has the defect that the synthesized voice cannot be made to resemble a natural voice. The rule synthesizing system cannot easily produce a concatenating rule for making the voice resemble a natural voice and at present its sound quality is poorer than that of the synthesized voice according to the above analyzing and synthesizing system.

As described, the above recording and editing system, analyzing and synthesizing system and rule synthesizing system have advantages and disadvangates.

In the service system utilizing a computer, the recording and editing system for providing better sound quality than other systems is frequently used. For example, short sentences as voice responses to various service requests are pre-recorded and edited for respective requests and the voice data of these short sentences are selected as responses when respective service requests occur. However, the responses are performed in accordance with predetermined sentences. Thus, the voice service, including the name of the requester and the name of the opposite receiver, cannot be performed. This is because all the combinations of transmitter and receiver names and fixed messages should be stored as short sentences and this is impossible from the view point of memory capacity.

For example, if the facsimile machine of the opposite party is in a faulty condition or is busy, the data transmitted is temporarily stored in the computer system. The computer system then transmits a voice message to the telephone of the opposite party. However, the message service transmitted to the receiver is a fixed message such as "facsimile has been received". Therefore, there is a problem that the transmitter and the receiver of the facsimile cannot be identified.

SUMMARY OF THE INVENTION

An object of the present invention resides in that the transmitter can transmit data in a multi-media communicating system without needing to recognize the kind of the media at the receiver.

In a system in which information communication can be conducted between a transmitting medium and a receiving medium through a center, a media information file establishes a relation between the ID table of the user and the kind of medium used by the user and stores them. When the transmitting side medium produces a calling to the center, a transmission request processing means searches the ID table of the transmission side media and obtains the kind of the media for the ID table, thereby outputting the input request for the receiver ID and the data transfer instruction. The request is made by a personal computer display or by voice. The voice request is performed in conversation style, for example, with an operator.

In accordance with a request from the transmission request process means, the response means converts the data transmitted from the transmission side medium to the data for the receiving-side desired medium, by using the receiver ID transmitted from the transmitting side media, thereafter allowing the data to be transmitted.

Another object of the present invention is to produce a desired voice response and an inexpensive system with an economic structure.

The first storing means stores respective different sound piece data, such as the data by ADTCM, for respective coded sentence part units, a first descriptor being added to the sound piece data. The sentence part comprises, for example, a noun, adjective, or verb, and is "a facsimile has been received". The second storing means stores respective different sound piece data of coded sentence part units, a second descriptor being added to the sound piece data. The sentence part comprises, for example, "from Mr.x x x" and "to Mr.x x x". The first storing means stores a fixed sentence part (namely, a sentence part used for a general purpose) and the second storing means stores, for example, an individual noun attached to the fixed sentence part.

The third storing means stores a sound piece constituting a sentence in single-sentence units by using a first descriptor and a second descriptor.

The control means reads a desired structure stored in the third storing means when a voice output request signal is received and reads sound piece data designated by the first descriptor constituting the sentence structure and stored in the first storing means. The control means also reads sound piece data designated by the designated data attached to the voice output request signal and designated by the second descriptor. The first descriptor is a fixed sentence part and is determined when a single sentence structure is read from the third storing means and is not determined by the second descriptor. The second descriptor designates, for example, "To Mr.x x x" and "From Mr. x x x" and the designation data attached to the voice output request signal determines that x x x is YYY. The designation data designates x x x and the sound piece data of a sentence part including an individual noun, such as the name of a predetermined person, can be obtained. The control means arranges the read-out sound piece data in accordance with a sentence structure and forms a voice message response signal for output. Therefore, a voice such as "a facsimile from Mr. YYY to Mr. III has been received" is produced as a response. Even if a few kinds of sound parts are stored in the second storing means, various sentences can be produced by a voice in a combination of sound pieces.

The data attached to the sound output request signal determines the sentence structure to be transmitted in accordance with a designation applied through a line from a telephone terminal apparatus, such as a designation from a computer or a push-button. A request signal producing means adds the data designating the sound piece data stored in the second storing means for designating, for example, the individual noun. The request signal producing means receives a special information such as that of a transmitter or a receiver, for example, a telephone number, and adds the data designating the sound piece to the voice output request signal. That designation can be easily conducted by a computer or a push-button. The special information from the exchange apparatus may be automatically produced even if any request is inputted.

BRIEF DESCRIPTION OF THE DRAWINGS

FIG. 12 is a flowchart of a registration and deletion.

DESCRIPTION OF THE PREFERRED EMBODIMENT

In order to explain the present invention in more detail, an explanation will be made by referring to the attached drawings.

Figure 1:
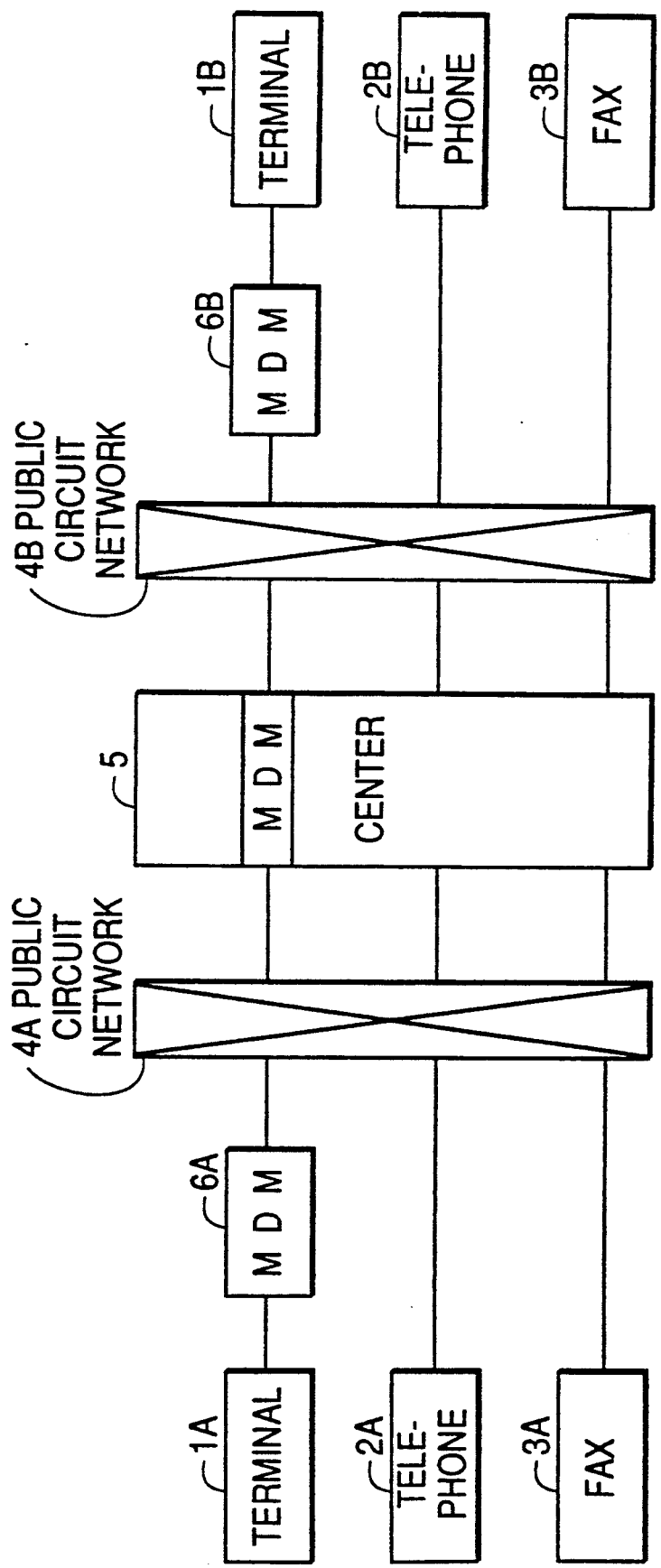
FIG. 1 is a structural block diagram of a conventional multi-media communication system
Figure 2:
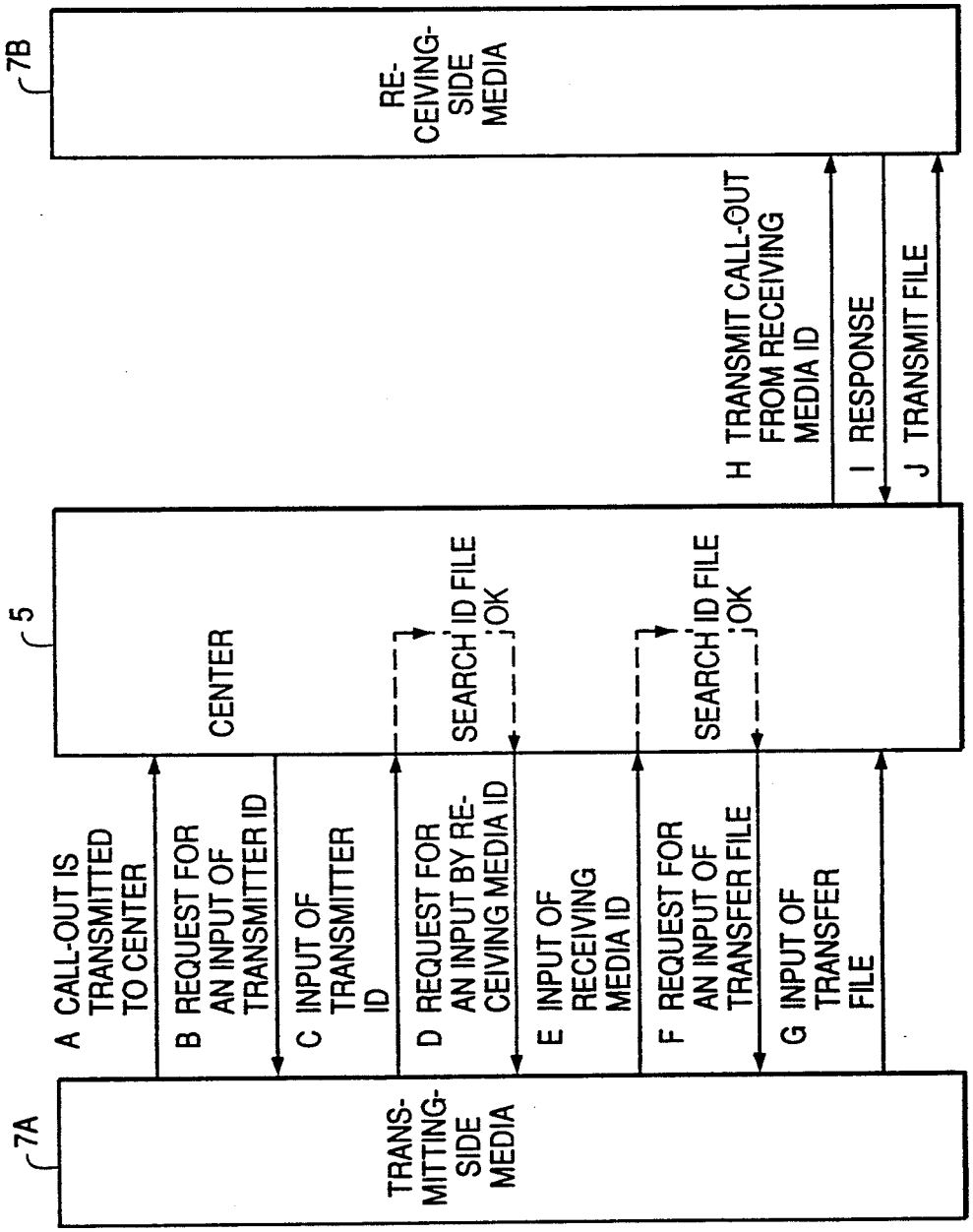
FIG. 2 shows a sequence of a conventional multi-media communication.
Figure 3:
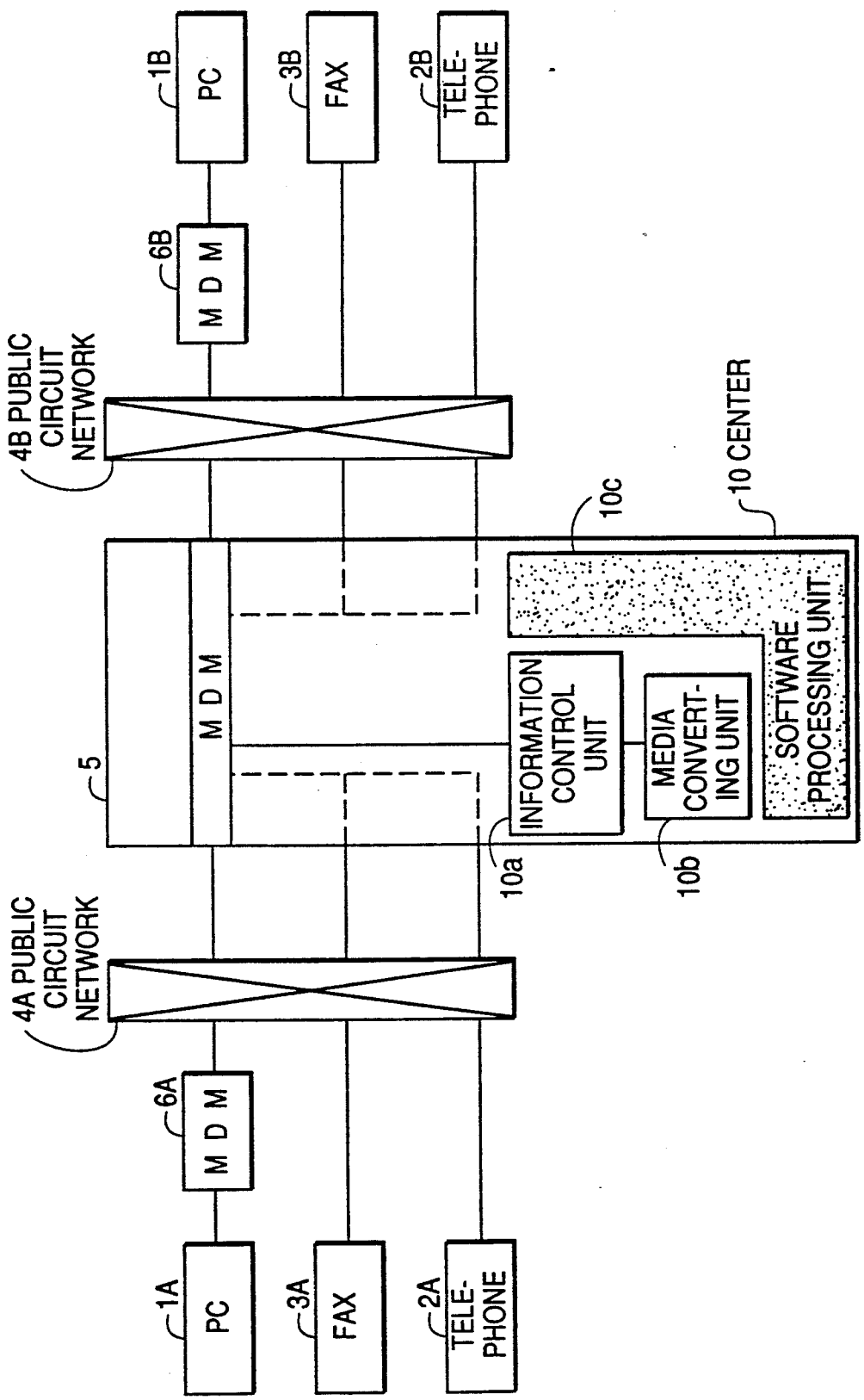
FIG. 3 is a structural block diagram of a multi-media communication system as an embodiment of the present invention.

FIG. 3 is a structural view of a multi-media communication system as an embodiment of the present invention. The same parts as in FIG. 1 are designated by the same reference numbers. In FIG. 3, center 10 has an information control unit 10a, medium converting unit 10b and a software processing unit 10c. Information net 10a includes an MPU and performs a data transfer control between a transmitting side and a receiving side, together with software processing unit 10c. Information control unit 10a also includes a medium information storing file and an information control status unit. Medium converting unit 10b converts the data format from the transmitting side medium to the data format of the receiving side medium.

Figure 4:
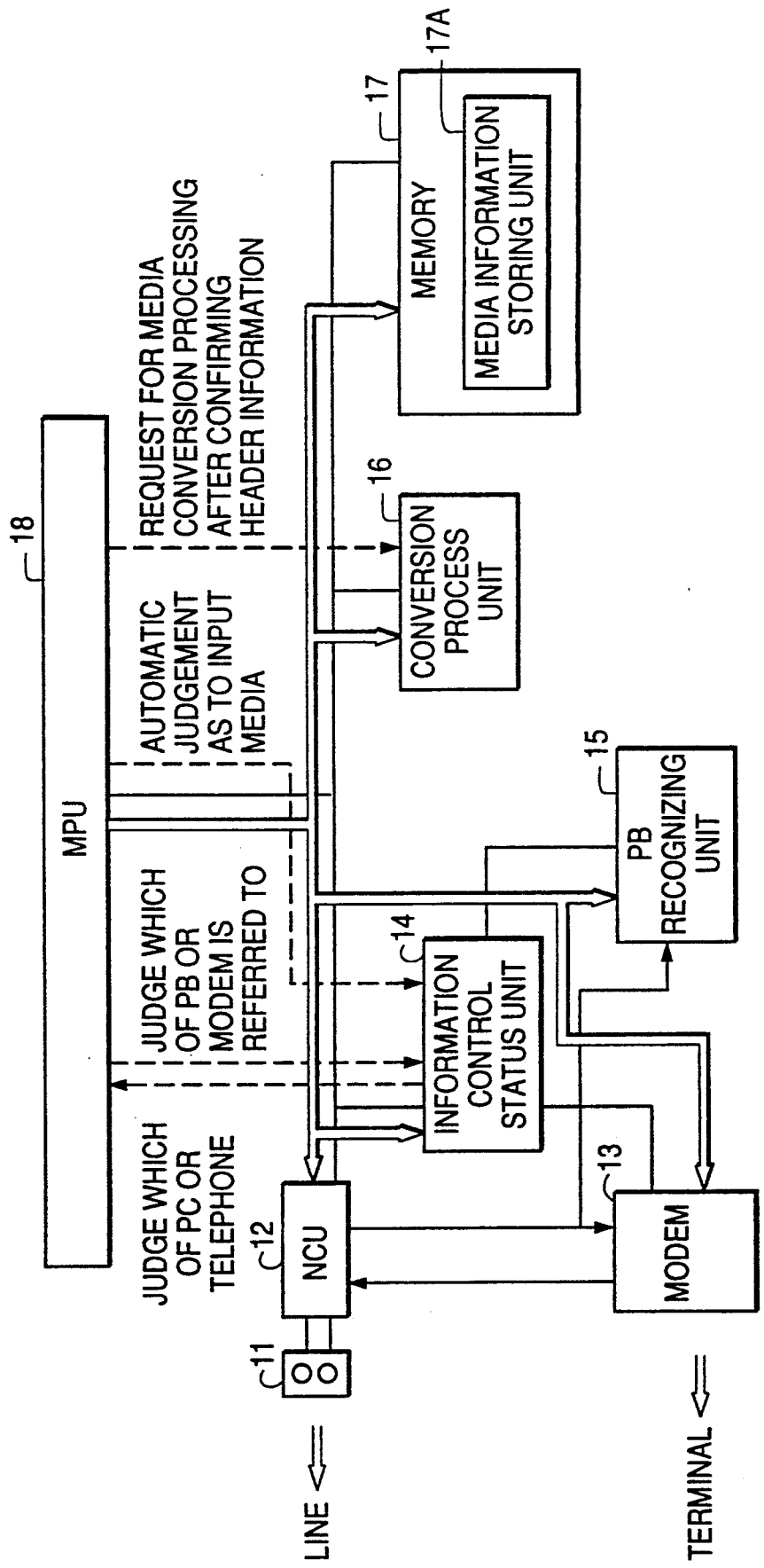
FIG. 4 is a block diagram of an example of a structure of a center.

FIG. 4 is a block diagram of an example of a structure of center 10. Line connecting unit 11 is connected by a line to NCU 12. NCU 12 converts information from the line to a digital signal and converts information to be transmitted to the line to analog signal. Modem 13 is connected to a terminal of a personal computer. Information control status unit 14 performs a judgment of the kind of terminal which makes access to this center 10 and performs a judgment of an input medium. PB recognizing unit 15 recognizes a push button (PB) signal from the line. Conversion process unit 16 performs a PCM.CODEC (which applies an A/D conversion and D/A conversion to a voice signal) and performs a medium conversion. Memory 17 stores media information file 17a comprising a user ID table and media information table. MPU 18 performs a control of the whole operation.

Figure 5:
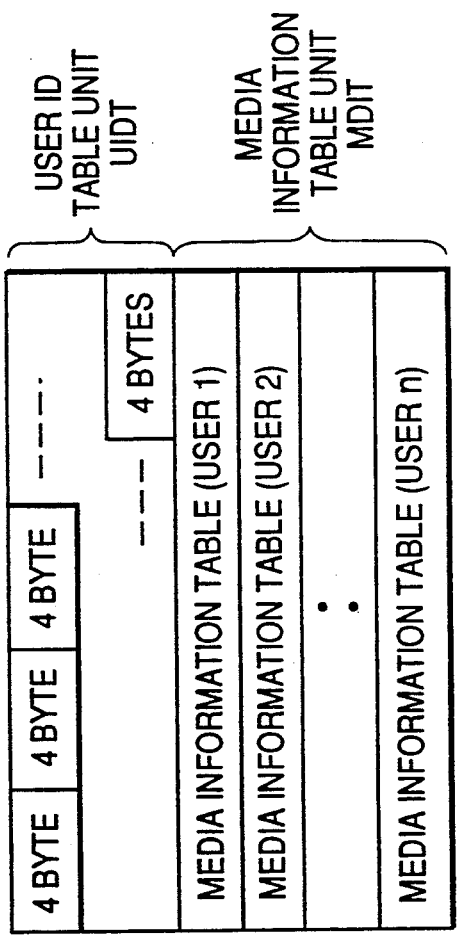
FIG. 5 shows an example of a structure of a media information storing file.

FIG. 5 shows a structural view of an example of medium information storing file 17a. Medium information storing file 17a comprises a user ID table unit (UIDT) and a media information table unit (MDIT) for storing media information for respective users. For each user, 4-bytes are provided in the user ID table unit UIDT. The media information table unit MDIT is also provided for respective users.

Figure 6:
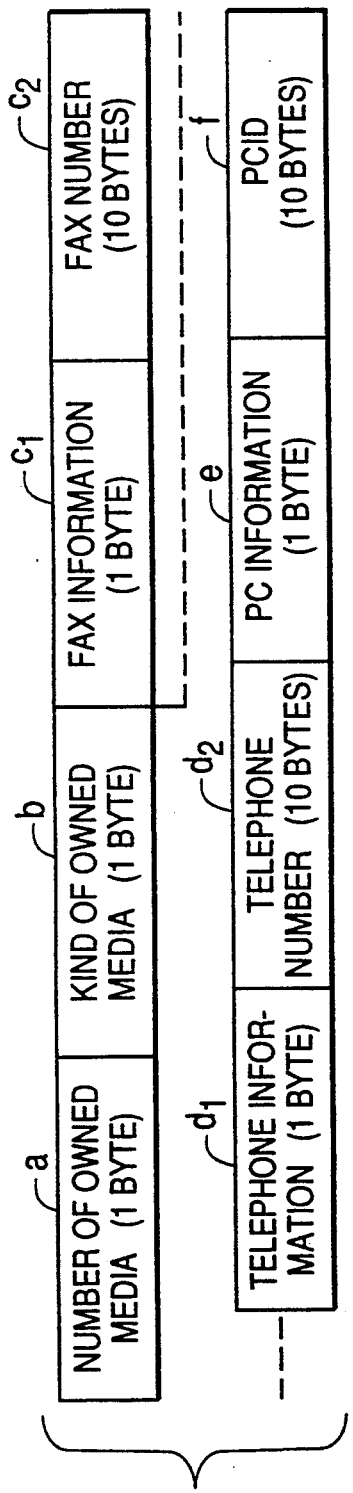
FIG. 6 shows a detailed structure of a media information table.

In FIG. 6, a shows the number of owned media (1-byte), b means the kind of owned media (1-byte), $c_1$ is FAX information (1-byte), $c_2$ is FAX number (10-bytes), $d_1$ is telephone information (1-byte), $d_2$ is telephone number (10-bytes), e is PC (personal computer) information (1-byte), f is PCID (10-bytes). A relation between the kind b of the owned media and the stored data (code) is as follows.

00 only FAX
01 only telephone
02 only PC
03 FAX and telephone
04 FAX and PC
05 telephone and PC
06 FAX, telephone and PC As the media kind differs depending on the user, the kind b of the owned media predetermines the kind. FAX information $c_1$, telephone information $d_1$ and PC information e are defined as follows.

0 not used
1 used.

Figure 7:
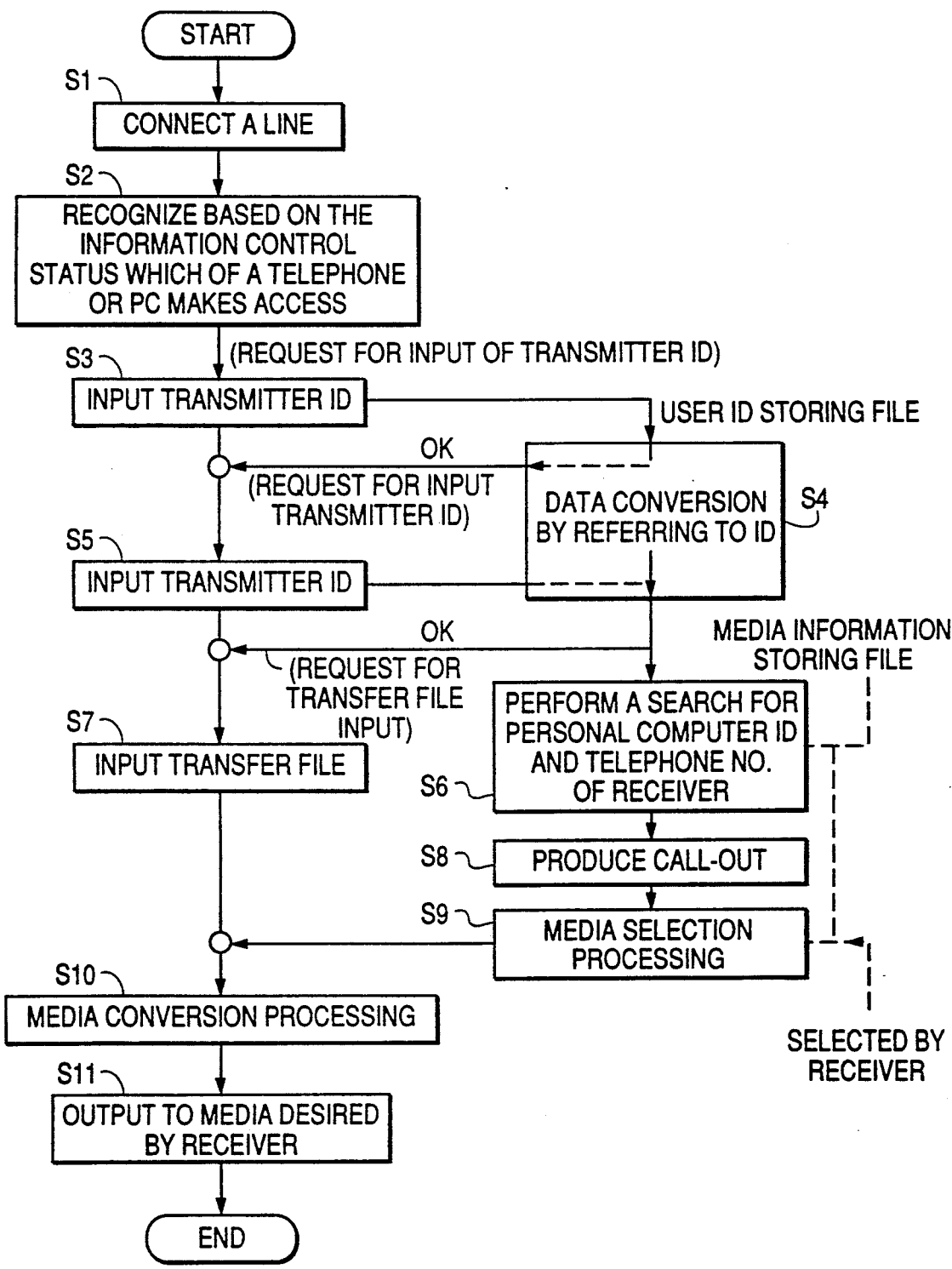
FIG. 7 is a flowchart showing an operation of a multi-media communication.

The final unit of the media inflation table is determined by the information of the kind of the owned media. The operation of the circuit shown in FIG. 4 and constructed as recited above is explained by referring to the flowchart shown in FIG. 7, for designating an operation of a multi-media communication, and the flowchart shown in FIG. 9, for performing information selection in a multi-media communication.

At the production of a call-out (K), when a line is connected to a center (S1), information control status unit 14 recognizes based on the information control status, which of a telephone or PC (S2) makes access. To judge which kind of terminal makes access, information control status unit 14 recognizes whether the access media is on the modem side or the line side. If it is on the line side, a judgement is made as to whether it is a facsimile machine or a telephone, thereby judging the input media.

Figure 8:
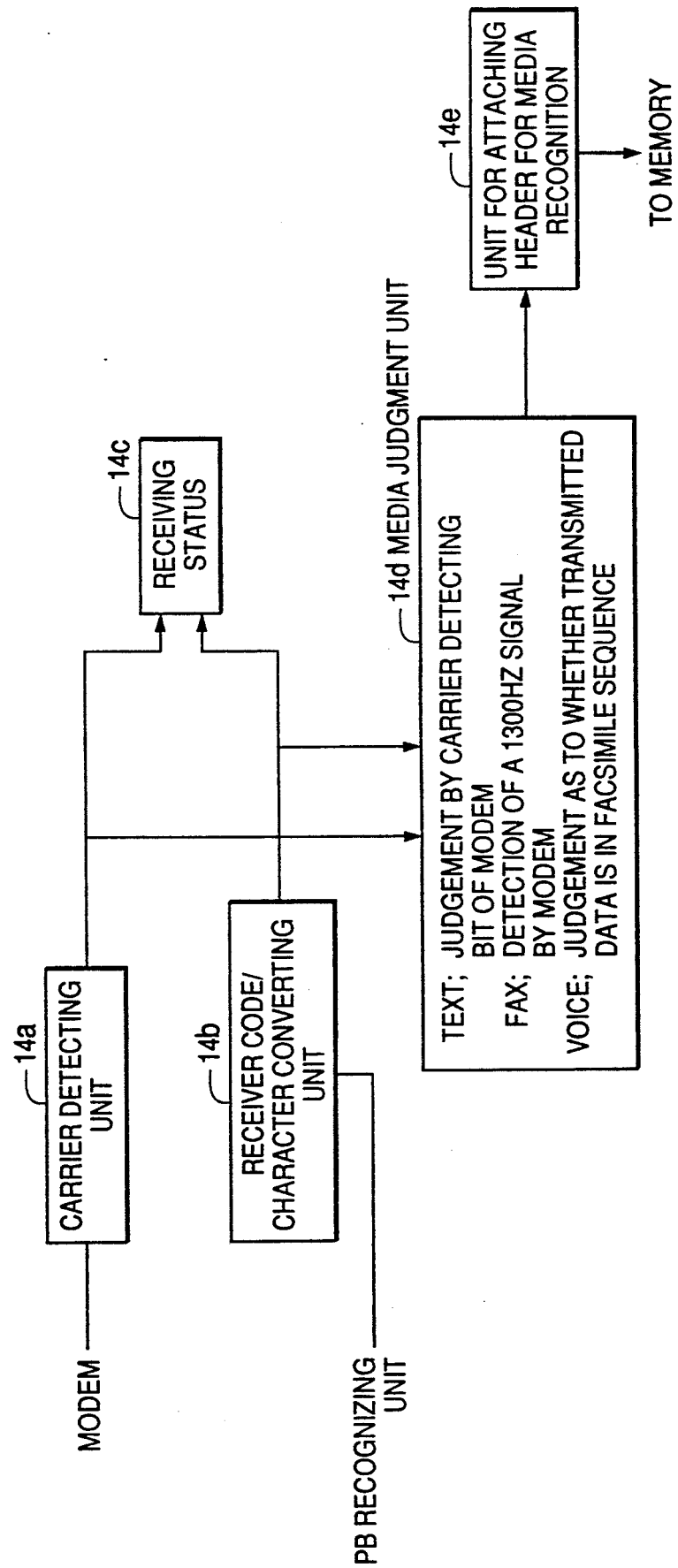
FIG. 8 shows an example of a structure of an information control status unit.

FIG. 8 shows an example of a structure of information control status unit 14 in process S2. A signal from modem 13 is inputted to carrier detecting unit 14a, thus enabling the carrier to be detected. The signal from PB recognizing unit 15 is inputted to receiving code/-character converting unit 14b, thereby enabling a conversion from the received code to the character. Receiving status 14c is obtained from these carrier detecting units 14a and receiving code/character converting unit 14b.

On the other hand, the output from carrier detecting unit 14a and receiving code/character converting unit 14b are inputted to media judgment unit 14d and the kind of the media is determined. The judgment of medium judging unit 14d is as follows.

Text; This is judged by a carrier detection bit of a modem

FAX; This is judged by detecting a 1300 Hz signal by a modem.

Voice; This is judged depending on whether or not the transmitted data is the FAX sequence.

When the judgment of the medium is completed, the following header attaching unit 14E attaches a header of a medium recognition to be transmitted to memory 17. The header is one of:

00; text
01; facsimile
02; voice

The explanation continues by returning to FIG. 7. When the process S2 recognizes the kind of access and the center requests the particular media to input the transmitter ID (L) in response to this request, the transmitter inputs the transmitter ID (S3,M). MPU18 searches media information storing file 17a based on the input ID, performs a reference to a user ID and converts the input data to character data when the transmitter uses a telephone (S4). As a result, when the user ID accords with the input ID, MPU18 requests the transmitter ID to input the receiver ID (N).

In response to a transmission request by MPU18, the receiver ID is inputted sequentially from the transmitting side medium (S5,D), and MPU18 performs a reference to a receiver ID by searching media information storing in file 17a based on the input ID (S4). As a result, when the input receiver ID exists in the user ID, MPU18 requests the transmitting side medium to input the transfer file (P1) and then performs a search for the personal computer ID and the telephone number of the receiver (S6). It performs this search by referring to a medium information table (shown in FIG. 5) of media information storing file 17a.

As a result, the transmitting side medium inputs the transfer file, namely, the transfer data (S7, Q1), and it also produces a call-out to the receiving side medium (S8,R) and the call-out (R) is transmitted to the telephone of the receiver. The receiver off hooks the telephone when the bell rings (S). The center answers the receiving side media by stating "this is *** center. A message has been received from Mr. JJJ to Mr. YYY. Which media do you wish to use for receipt in response to this inquiry? (T)". The receiver pushes, for example, a PB button to determine the kind of media to be received (S9,U). In order to enable a receipt using a plurality of media, a response is made in the form of YES or NO.

The response (supposing that the receiver has a FAX machine, a telephone apparatus, and a terminal of a personal computer) is as follows. "Please select a medium for use in receipt. In case of YES, "1" and "#" and in case of NO, "0" and "#" should be inputted. Do you wish to receive the signal by FAX? (waiting for an input) Do you wish to receive the signal by telephone? (waiting for an input)".

When this process is completed, MPU18 determines the medium based on the header of the transmitted information and converts it into the medium desired by the receiver, using conversion process unit 16 through a medium conversion (S10), and outputs a transfer file to the medium desired by the receiver (S11,V).

Figure 9:
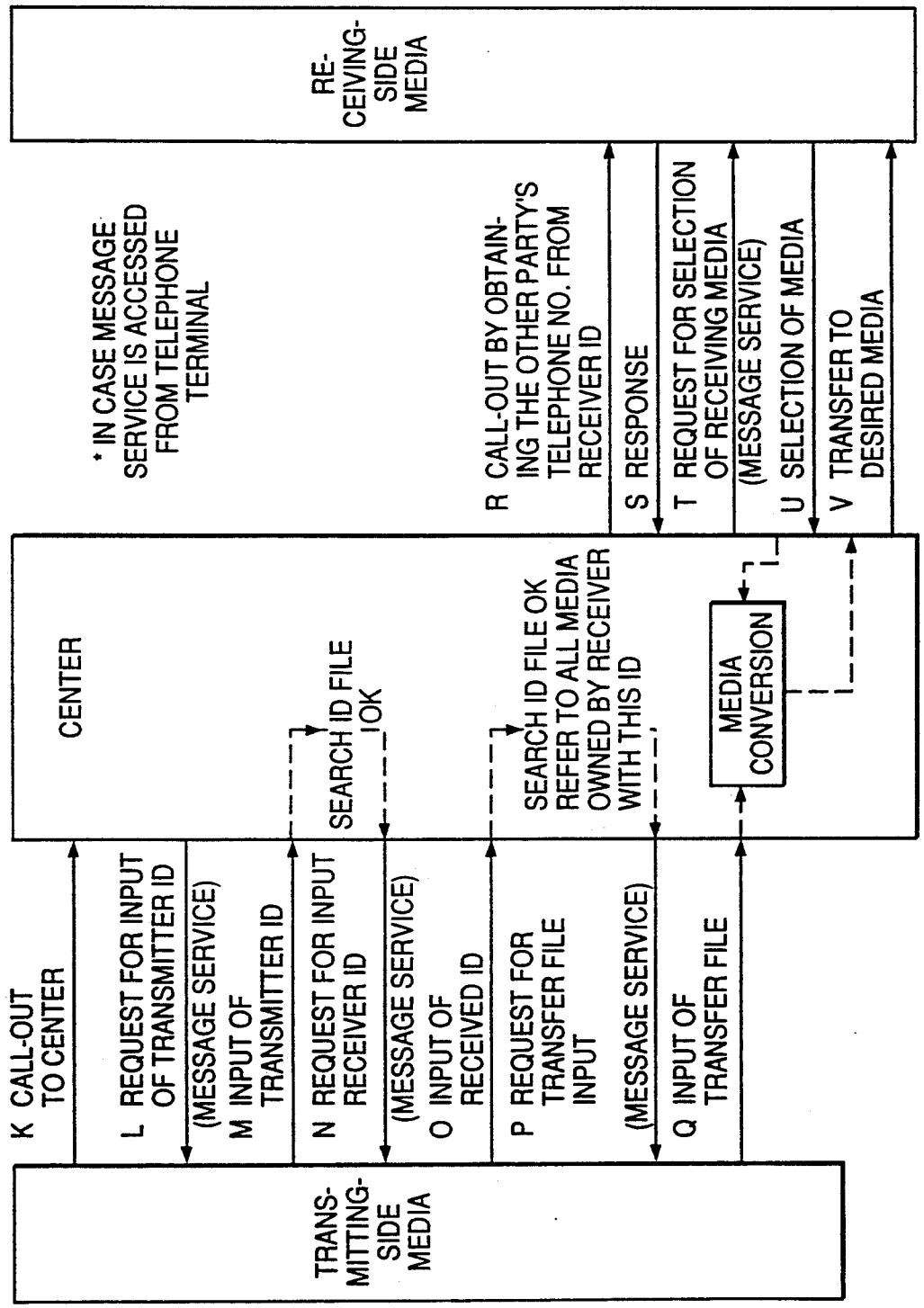
FIG. 9 is a process flowchart of showing a selection of media information in a multi-media communication.

FIG. 9 shows a flowchart of a media information selection in the above recited multi-media communication.

Next, registration and deletion of the media are explained for the media information storing file (as shown in 17a in FIG. 4 and FIGS. 5 and 6). In order to perform a media registration and deletion irrespective of the data transmission and receipt, "media registration ID" is provided.

Figure 10:
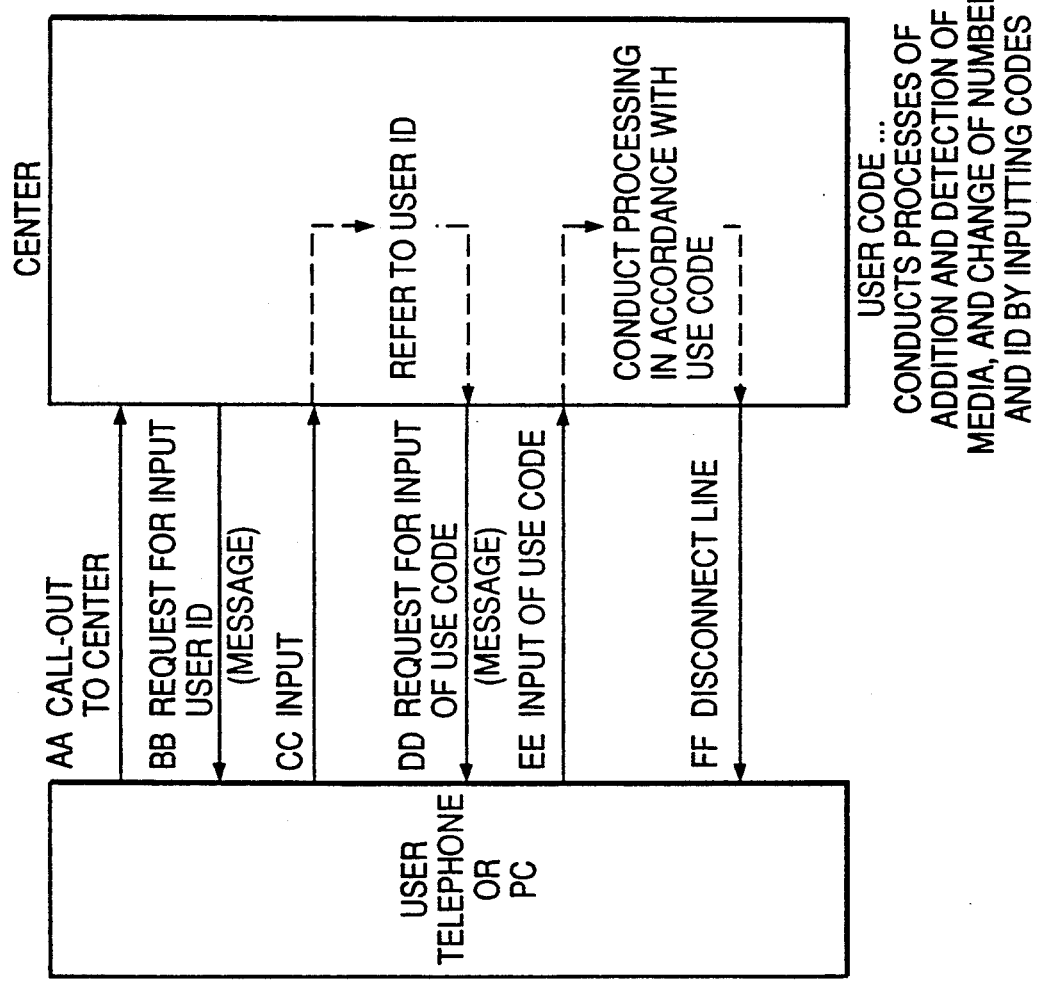
FIG. 10 is a flowchart showing an addition and deletion of a medium.

FIG. 10 shows a flowchart for explaining an addition and a deletion of a medium. A call-out is transmitted from the medium side to the center (AA). The center requests a user ID input (BB). When the medium inputs the user ID (CC), the user ID is subjected to a comparison and the center requests the medium to input the use code when the accord is established as a result of a comparison (DD). The use code is to process an addition and deletion of the media and the change of the ID number by inputting respective codes. The center performs an inquiry, such as "Please input the process code", as the input request of the use codes. The predetermined code (use code) is thus inputted in accordance with the registration, deletion and change of the medium (EE).

When a new medium is registered, upon an input of the process code, the center produces a message such as "Please input the code of the kind of newly owned media". In response to this message, the user inputs the code by producing a message such as "A new media is YY and ZZ". After completing this process, the line is cut off and all the processes are completed (FF).

In the above explanation, telephone, FAX and personal computer terminal are mentioned as examples of the media. However, the present invention is not limited to these media, but may be applied to other kinds of the terminals.

The embodiment of the present invention mainly uses a telephone as a medium. The telephone is the most basic medium and can conduct a registration and deletion of ID. A conversation type by a voice is utilized for this medium and a voice output apparatus is required to output the voice by changing an object sentence to a voice. For example, in the registration of the medium, the message "a new medium is YY and ZZ" is outputted. The above message comprises a fixed sentence and a variable sentence. The response control by voice in the embodiment of the present invention will be explained in detail, beginning with its system.

Figure 11:
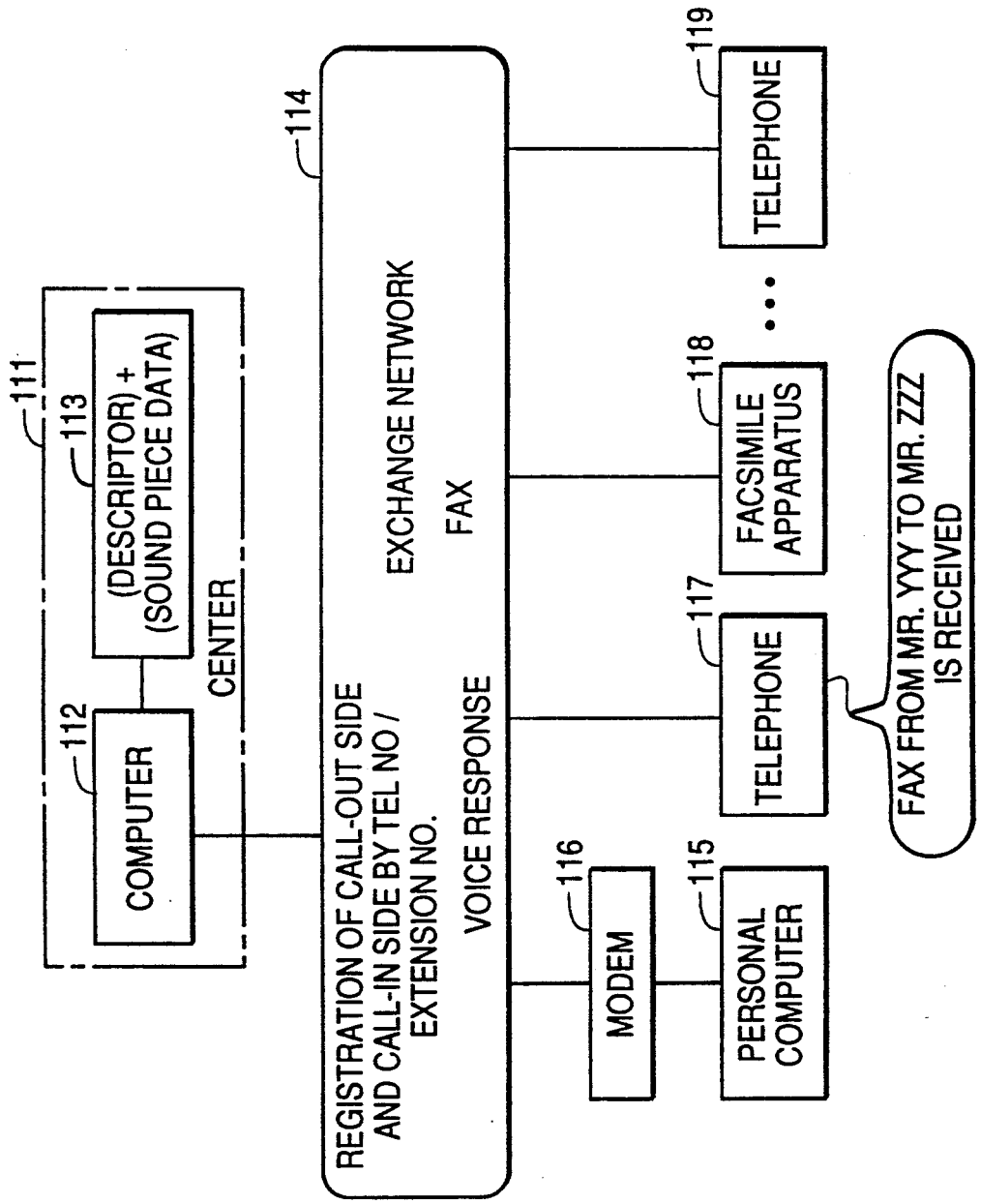
FIG. 11 is a block diagram of an embodiment of the present invention.

FIG. 11 is a block diagram of an embodiment of the present invention. Center 111 performs a text mailing for personal computer 115 or word processor, a voice mailing for telephones 117 and 119, a facsimile mailing for facsimile apparatus 118, a display service, various information displaying services, conversion from a text to a facsimile system and a conversion from a text to a voice and a mail-arrival notifying service for notifying an arrival of the mail by voice. These services are controlled by a computer provided in center 111. The data to be stored is memorized in file 113 and read out when required. In these various kinds of the services, a voice response using file 113 is performed for telephones 117 and 119 from center 111.

A registration and deletion of a sound piece data into and from file 113 is performed, for example, by personal computer 115 and telephone 117. The terminal apparatus of the service supplier included in exchange network 114 can register the sound piece data to constitute various guidances in center 111.

FIG. 12 shows a flowchart of a registration and deletion in center 111. Personal computer 115 included in exchange network 114 sends a call-out to center 111. Center 111 then detects a call-in (S101) and is connected to personal computer 115. This connection is performed by enabling the exchange network to detect the PB signal (the telephone number of the center) outputted, for example, from the MCU equipped in modem 116, to call the center, and enabling the center 111 to detect a ringer and enabling NCU in center 111 to close a direct current circuit. Center 111 outputs a menu screen under the control of computer 112 (S102).

The menu screen is displayed by personal computer 115. This transmission is conducted by a communication of a modem through a line. An operator inputs a request of a registration or deletion in accordance with the content of the display. Computer 112 of the center 111 receives the request inputted by the operator to a conversion apparatus and is added to center 111. Thus, computer 112 in center 111 judges this request (S103). When this request is the registration request, a display of the guidance of the telephone call-out request is performed (S104), namely, telephone 117 designates a call-out. Further, a registration guidance from computer 112 of center 111 is designated to be inputted (S105) and designates (S106) a start key of the voice input and a stop key of the voice input (the push button such as * and # of telephone 117). Therefore, an operator inputs a voice to a telephone 117 in units of sentence parts to be registered and computer 112 of center 111 performs PCM, DPCM, and ADPCM coding operation. Upon this coding, digital voice data is obtained (S107), the descriptor is added to the digital voice data by voice data management process (S108) and the digital voice data is stored in file 113. The descriptor is selected to be completely different from that attached to the already registered sound piece data.

The above operation is related to an analog conversion network. When the exchange network 114 is a digital exchange network, digital data of a sound piece digitized by the telephone is compressed, coded and registered in file 113 by attaching a descriptor to the digital data in the same manner as is recited above.

In case of a deletion request, the contents of file 113 is transmitted under the control of computer 112 and a list of data which are already registered in personal computer 115 is transmitted to be displayed on personal computer (S109), and further, a deletion sentence structure number input designation can be conducted (S110). When a deletion sentence structure number is inputted from personal computer 115 through an exchange network, computer 112 deletes sound piece data from the deletion sentence structure number file 113 based on the sound piece data management process (S111). As is described above, an operation of the descriptor and a registration and deletion of the data is performed in file 113 in center 111.

The present invention relates to a voice and center 111 supports an electronic mail as well as facsimile mail. The operation of these mails will be explained later. Next, a file for storing the sound piece data is explained.

Figure 13A:
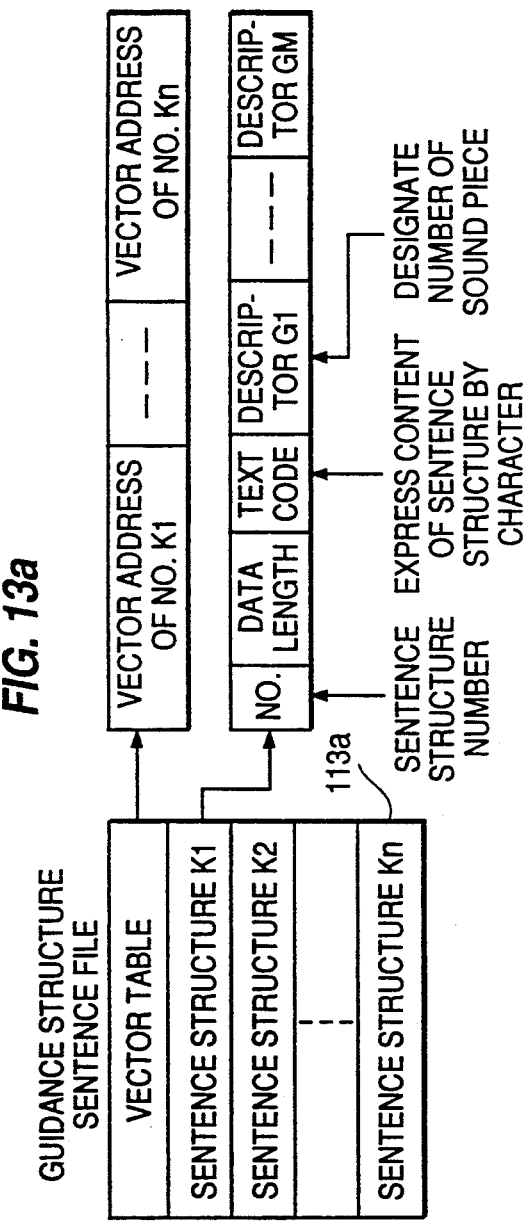
FIGS. 13(a), 13(b) and 13(c) are explanatory view of a file of an embodiment of the present invention.
Figure 13B:
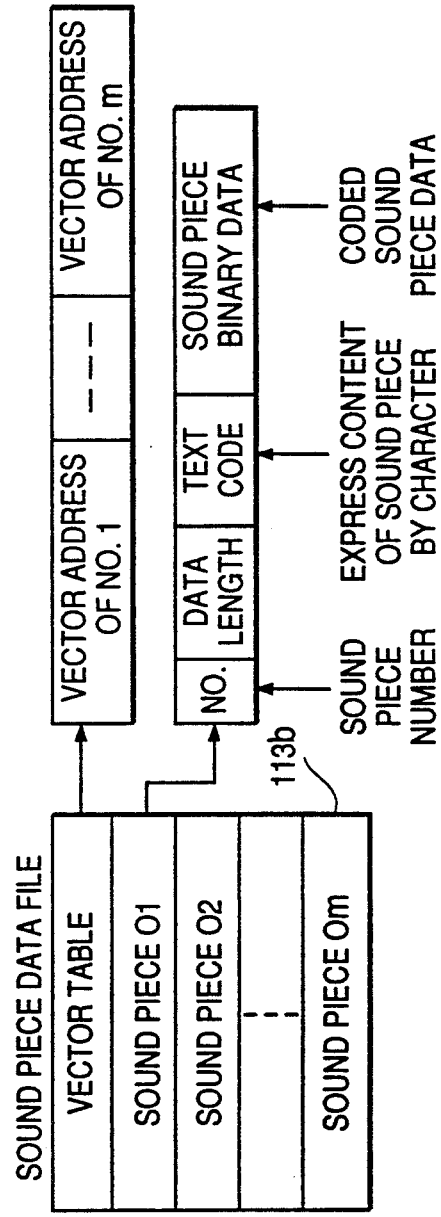
Figure 13C:
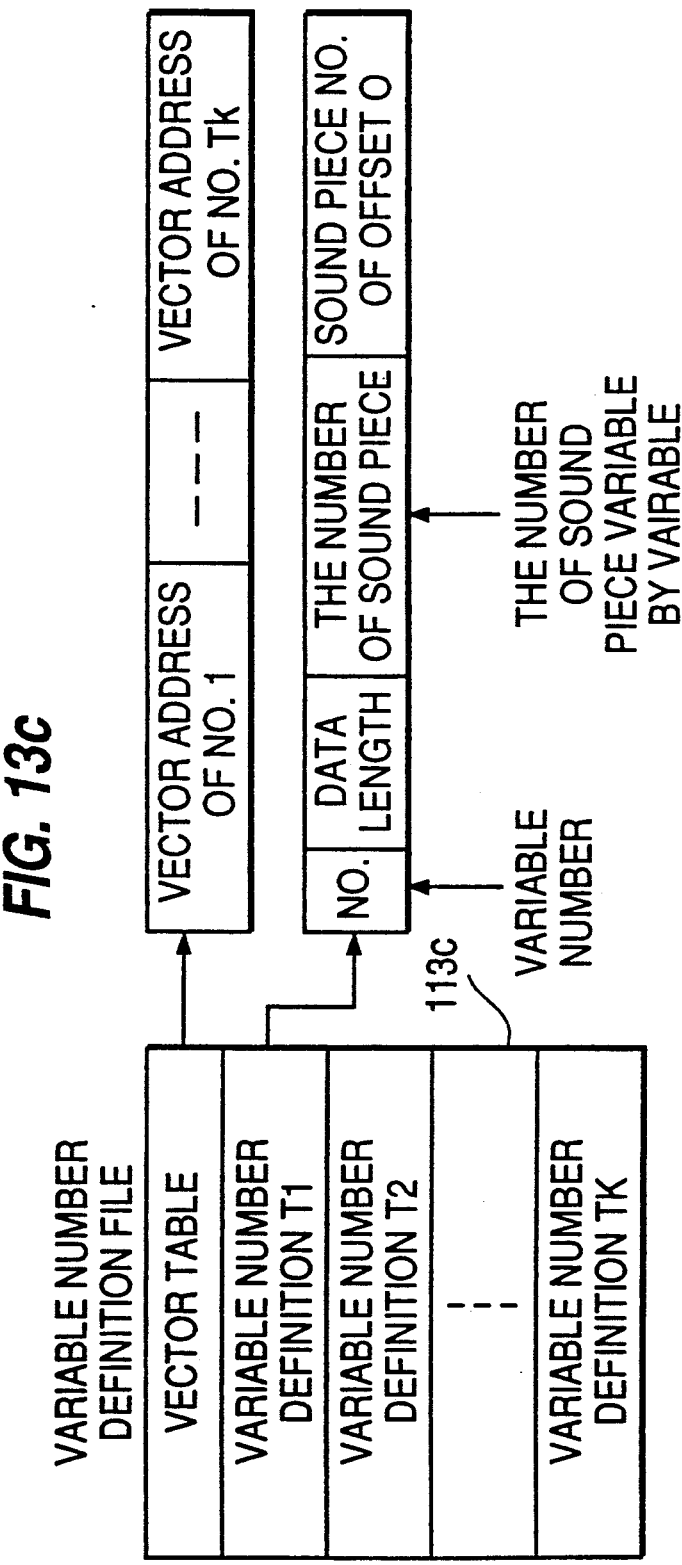

FIGS. 13(a)–13(c) are explanatory views of file 113 of center 111. A file relating to the data comprises guidance structure sentence file 113a, sound piece data file 113b and variable number defining file 113c. Guidance structure sentence file 113a comprises a vector table and structure sentences K1−Kn. The vector table comprises a vector address number No.K1−No.Kn. The structure sentences K1−Kn comprise a combination of descriptors constituting a structure sentence, and comprises a structure sentence number, data length, a text code and descriptors G1−GM. The data length show the number of bytes of the text code and descriptor and the text code expresses the content of the structure sentence corresponding to the number of the structure sentence by using a character and descriptors G1−GM are to designate the number of the sound piece data.

Sound piece data 113b comprises a vector table and sound pieces 01−Om. The vector table forms vector address No.01−No.Om. Sound pieces 01−Om are formed of the numbers of sound piece, data length, text code and sound piece binary data. The data length shows the number of bytes of the text code and the sound piece binary data. Text code expresses the content of the sound piece by using a character. The sound piece binary data comprises the sound piece data encoded by, for example, ADPCM encoding.

Variable definition file 113c comprises a vector table and variable definition T1-Tk. The vector table is formed of the vector addresses of No.T1-No.Tk. The variable definitions T1-Tk are formed of the number of the variable, data length, the number of sound pieces and the number of the sound piece of the offset 0. The data length shows the number of bytes of the sound piece number of the offset 0 and the number of the sound piece shows the number of the sound piece varied by using the value of the variable. The sound piece number of the offset 0 designates the number of initial sound piece data determined by the value of the variable.

In case of a sentence structure of sentence structure number K10 "an arrival of a mail is notified", the sentence structure number K10, the data length, the text code "an arrival of the mail is notified" and descriptor %10 are stored in a region of a sentence structure number k10 of guidance structure sentence file 113a. The text code is a character code used when displayed on personal computer 115. Sound piece number 010, the data length, the text code "an arrival of a mail is notified" and an encoded sound piece binary code are stored in a region of sound piece number 010 in sound piece data file 113b.

For example, in case of a sentence structure K11, the data within the mark < > is a variable and "<the name of the receiver> < the name of the transmitter>, <the mail media> is received" is the content. Sentence structure number k11, the data length, the text code "<the name of the receiver> < the name of the transmitter> <mail medium> is received" and descriptors $10, $11, $12 and %11 are stored in a region of sentence structure K11 of guidance structure sentence file 113A. $10, $11, and $12 designate the variable definitions T10, T11 and T12. The sound piece number, data length and text code "is received" are stored in a region of sound piece number 011 in sound piece data file 113b. The number of the variable, data length, the number of the sound piece and the sound piece number of offset 0 are stored in a region of the variable definitions T10, T11, and T12 in variable definition file 113c. The sound piece data in accordance with the sound piece number of offset 0 is stored in the sound piece data file 113b. Namely, the name of the receiver and the name of the transmitter, for example, are registered as sound piece data.

In the variable definition, the object number is added to the sound piece number of offset 0 in accordance with an occurrence of the respective requests, thereby determining an object sound piece number so that respective object voices are produced.

Figure 14:
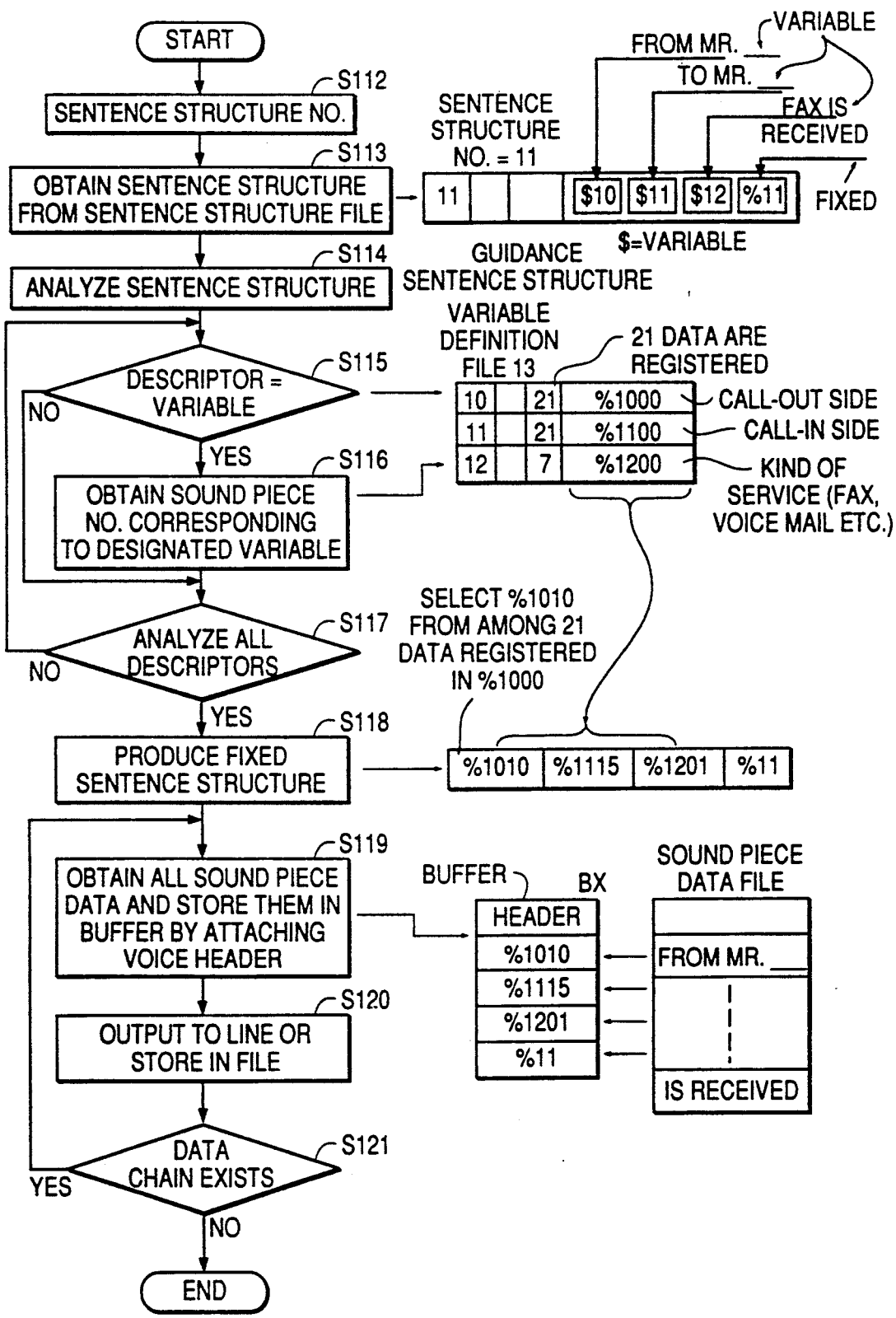
FIG. 14 is a flowchart of an embodiment of the present invention.

FIG. 14 is a flowchart of an embodiment of the present invention. When a voice response is performed under the control of computer 112 of center 111 and the sentence structure number corresponding to a state such as a start of a communication, a notification of a mail arrival, a designation of a mail transmission and a completion thereof, for example, are obtained (S112). A sentence structure is read out from guidance structure sentence file 113a in accordance with the number of sentence structures (S113). For example, for sentence structure number K11 in the state of the notification of the mail arrival, the vector table of guidance sentence structure file 113a is referred to and the contents, including the sentence structure comprising a combination of descriptors, are read out.

The structure is analyzed (S114) and it is determined whether the variable is included in the descriptor (S115). For structure number K11, a descriptor comprises a combination of $10, $11, $12 and %11 and as the variable $ is included, the vector table is referred to by the variable number definition file 113c and the sound piece number corresponding to the number of the variable number is read out from the region for defining the variable (S116). For example, as shown in FIG. 14, for the number T10 of the variable, the number of sound pieces is 21, and sound piece number is %1000 (the sound piece number of offset 0). For the number 11 of the variable, the sound piece number is 21 and the number of sound piece is %1100. For the number 12 of the variable, the sound piece number is 7 and the number of the sound piece is %1200.

By repeating the above recited process S116, a repeated judgment is made as to whether an analysis of all the descriptors is completed (S117). For a completion, a fixed structure sentence is produced (S118). Where the variable is not included, the fixed sentence structure is produced upon completion of an analysis of all the descriptors (S118). For the above recited sentence structure number K11, a fixed sentence structure comprising a combination of the sound piece numbers is produced in buffer BX designated in FIG. 14. Buffer BX is provided, for example, within a memory in computer 112.

Sound piece data is read from the sound piece data file in accordance with the fixed sentence structure and is stored in the buffer by attaching the voice header to the head of all the sound piece data (S119) (the sound piece data corresponding to the number of sound piece %1010, %1115, %1201, and %1111 is read out from the sound piece data file and stored in the buffer). For example, in case of "a facsimile has been transmitted from Mr. xxx to Mr. xxx", "from Mr. xxx" is obtained from the variable definition file and "from Mr. YYY" is obtained from the sound piece number of offset 0, namely, the sound piece number, for example, %1010 out of %1000. The lower 2 digits "10" of %1010 are obtained from the source number from which the facsimile is transmitted. The "to Mr. xxx" is also treated in the same way. The "to Mr. ZZZ" is obtained from the sound piece No. of offset 0, namely, the sound piece number of, for example %1111 out of 1100. In this case, also, the lower 2 digits, 15 of %1115 represent the value obtained from the number by which a facsimile is received. Thus, "facsimile" is obtained from the sound piece No. of offset 0, namely, the sound piece number of %1201 out of %1200. The lower 2 digits "01" of this number are determined by the source process through which the request is produced when a facsimile from a person to another person is stored in center 111.

The contents of this buffer are outputted to a line or stored in a file (S120). If it is outputted to a line, a voice response such as "facsimile mail (mail media: sound piece number %1201) has been received from Mr. YYY (the name of the transmitter: sound piece number %1115) to Mr. ZZZ (the name of the receiver: sound piece number %1010)" is conducted from center 111 to telephone 117 (or 119) through exchange network 114.

Where the total amount of sound piece data is large compared with the capacity of the buffer, divided processes are conducted by performing a data chain. Therefore, the existence of the data chain is determined (S121). If the data chain exists, the process proceeds to step (S119) and if the data chain does not exist, the process is ended.

As described above, the sound piece data to which the descriptor is added is stored in the file and the sound piece data is registered or deleted in accordance with the flowchart shown in FIG. 3 by using personal computer 115 and telephone 117 as terminal apparatuses. In this case, the sound piece data to be registered is compared with the sound piece data which has been registered in file 113, for example, with regard to its code and only when they are not identical, the sound piece data to be registered is actually registered in file 113, thereby avoiding a double registration. Center 111 forms a sentence structure obtained, for example, by a combination of descriptors for telephone 119, and the sound piece data is read out from file 113 in accordance with a descriptor, thereby enabling the sound piece response to be conducted with a sound quality resembling to that of an actual voice.

In the above recited embodiment of the present invention, the sound piece data file sequentially stores the sound piece beginning with, for example, %10 and stores respective sound pieces such as %1000 . . . , and %1100 . . . , which follow it. However, the present invention is not limited to these sound pieces. A case exists in which the sound piece after %1000 is sometime changed depending on the region from the user, and may be provided as a separate file in a unit of respective variables.

The above recited exchange network 114 may be formed of a generally available exchange network but the exchange network manager manages, for example, a telephone number (for example, the number of an internal line). When the number of the transmitter is detected by the exchange apparatus, and when the number of the opposite party (the receiver) is inputted, the number is also stored. Where center 111 performs a service, this information, namely, special may produce a message such as "a facsimile has been arrived from Mr. YYY to Mr. ZZZ". By storing, using a code of a line and according to respective codes, the data as to what media is connected, the designation of the media as described above is not necessary and the message can be outputted fully automatically.

According to the present invention, the kind of receiving side medium and the ID of the opposite party (receiver) are recognized and then the desired media can be selected by telephoning the receiving side. When the desired medium is determined, the data file from the transmitting medium is subjected to a format conversion (media conversion) to a format suitable for the receiving side medium. The information transfer is then conducted. Therefore, the transmitting side medium can perform the data transmission without recognizing the kinds of media on the receiving side, thereby providing a multi-media communication system. Further, the present invention attaches a descriptor to the sound piece data of the unit of the sentence part which is encoded by DPCM, ADPC, for example and registers them in the file. The control unit comprising, for example, a computer forms a response sentence as a combination of descriptors and performs a voice response by reading the sound piece data from the file in accordance with these descriptors. It thereby manages the file based on respective sentence numbers and sound piece numbers. Therefore, even while the system is operating, additional registration or deletion of the sound piece data is possible by using, for example, a personal computer and a telephone. As respective different sound piece data are registered, it becomes unnecessary to provide a file with a specially large capacity and it is easy to form an appropriate voice response system.

Further, it is possible to form a discretional response sentence by using a program and it is possible to reproduce a voice, based on the stored and coded sound piece, with a quality resembling that of an actual voice.

What is claimed is:

1. A response control system comprising:
   first storing means for obtaining encoded first sound piece data, for attaching a first descriptor to respective encoded first sound piece data which represent units of a sentence part and for storing the first descriptor and corresponding encoded first sound piece data,
   second storing means for obtaining encoded second sound piece data, for attaching a second descriptor to respective encoded second sound piece data which represent units of a sentence part and for storing the second descriptor and corresponding encoded second sound piece data,
   third storing means for using the first and second descriptors stored in said first and second storing means to produce a plurality of sentence structures constituting a sentence and for storing the sentence structures, and
   control means for receiving a voice output request signal including designation data, for reading a sentence structure from said third storing means in accordance with said voice output request signal, for selecting among the first sound piece data and the second sound piece data based on the designation data to form voice data and for outputting a voice response signal indicative of the voice data.

2. A response control system for use in a service system, said response control system comprising a telephone terminal apparatus for transmitting designation data over a line, said response control system comprising:
   first storing means for obtaining encoded first sound piece data, for attaching a first descriptor to respective encoded first sound piece data which represent units of a sentence part and for storing the first descriptor and corresponding encoded first sound piece data,
   second storing means for obtaining encoded second sound piece data, for attaching a second descriptor to respective different encoded sound piece data which represent units of a sentence part and for storing the second descriptor and corresponding encoded second sound piece data,
   voice output request signal producing means for determining a sentence structure based on the designation data and using the designation data to designate sound piece data stored in said second storing means to produce a voice output request signal;
   third storing means for using the first and second descriptors stored in said first and second storing means to produce a plurality of sentence structures constituting a sentence and for storing the sentence structures, and
   control means for receiving a voice output request signal including designation data, for reading from said third storing means a sentence structure corresponding to the voice output request signal, for selecting among the first sound piece data and the second sound piece data based on the designation data to form voice data and for outputting a voice response signal indicative of the voice data.

3. The response control system according to claim 2, the telephone terminal apparatus comprising a modem and a computer apparatus connected to the modem to provide digital data to the service system over the line, wherein said voice output request signal producing means comprises:
   means for generating the voice output request signal from the digital data by attaching the sentence structure to the designation data.

4. The response control system according to claim 2, said telephone terminal apparatus comprising a push phone capable of generating a push button signal, wherein said voice output request signal producing means comprises:
   means for attaching at least one of the sentence structures to the designation data to generate the voice output request signal based on the push button signal outputted from the push phone.

5. A response control system for use in a service system having a computer connected by a line to an exchange apparatus and connected to a terminal that outputs special information corresponding to the exchange apparatus, comprising:
   first storing means for obtaining encoded first sound piece data, for attaching a first descriptor to respective encoded first sound piece data which represent units of a sentence part and for storing the first descriptor and corresponding encoded first sound piece data,
   second storing means for obtaining encoded second sound piece data, for attaching a second descriptor to respective encoded second sound piece data which represent units of a sentence part and for storing the second descriptor and corresponding encoded second sound piece data,
   request signal generating means for determining a sentence structure based on the special information output from the terminal corresponding to the exchange apparatus and for attaching designation data to the first sound data to produce a voice output request signal,
   third storing means for using the first and second descriptors stored in said first and second storing means to produce a plurality of sentence structures constituting a sentence and for storing the sentence structures, and
   control means for receiving a voice output request signal including the designation data, for reading from said third storing means a sentence structure corresponding to the voice output request signal, for selecting among the first sound piece data and the second sound piece data based on the designation data, and for outputting a voice response signal indicative of the voice data.

6. The response control system according to claim 5, wherein the exchange apparatus outputs the special information including a transmitting number as a request source number and a receiving number as a transmitting destination number.

* * * * *

UNITED STATES PATENT AND TRADEMARK OFFICE
CERTIFICATE OF CORRECTION

PATENT NO. : 5,146,488

DATED : September 8, 1992

INVENTOR(S) : Okada et al.

It is certified that error appears in the above-identified patent and that said Letters Patent is hereby corrected as shown below:

Title Page, [22], delete this section and insert in place thereof:

```
-- [22] PCT Filed:     Jun. 14, 1989
    [86] PCT No.:      PCT/JP89/00594
         §371 Date:    Feb. 14, 1990
         §102(e) Date: Feb. 14, 1990 --.
```

Title Page, [30], line 3, "Feb. 26, 1989" should be --Feb. 23, 1989--.

Col. 1, line 60, "(6)." should be --(G).--.

Col. 4, line 59, "system" should be --system,--.

Col. 5, line 14, "view" should be --views--.

UNITED STATES PATENT AND TRADEMARK OFFICE
CERTIFICATE OF CORRECTION

PATENT NO. : 5,146,488

DATED : September 8, 1992

INVENTOR(S) : Okada et al.

It is certified that error appears in the above-identified patent and that said Letters Patent is hereby corrected as shown below:

```
Col. 7,   line 12,  "(P1)" should be --(P)--;
          line 18,  "(S7, Q1)," should be --(S7, Q),--.

Col. 13,  line 57,  "a" should be --said--.

Col. 14,  line 42,  "sound data" should be --sound piece data--.
```

Signed and Sealed this

Second Day of November, 1993

Attest:

BRUCE LEHMAN

Attesting Officer

Commissioner of Patents and Trademarks